US009497958B2

(12) United States Patent
Shapiro et al.

(10) Patent No.: US 9,497,958 B2
(45) Date of Patent: Nov. 22, 2016

(54) POST MOUNTED DISPENSING DEVICE

(71) Applicant: Thermacell Repellents, Inc., Bedford, MA (US)

(72) Inventors: Stephen J. Shapiro, Bedford, MA (US); Wender Wang, Arlington, MA (US)

(73) Assignee: Thermacell Repellents, Inc., Bedford, MA (US)

( * ) Notice: Subject to any disclaimer, the term of this patent is extended or adjusted under 35 U.S.C. 154(b) by 0 days.

(21) Appl. No.: 14/848,052

(22) Filed: Sep. 8, 2015

(65) Prior Publication Data
US 2015/0373966 A1 Dec. 31, 2015

Related U.S. Application Data

(63) Continuation of application No. 14/016,526, filed on Sep. 3, 2013, now Pat. No. 9,127,833.

(60) Provisional application No. 61/695,803, filed on Aug. 31, 2012.

(51) Int. Cl.
*A01M 29/12* (2011.01)
*F21V 33/00* (2006.01)

(52) U.S. Cl.
CPC ............ *A01M 29/12* (2013.01); *F21V 33/006* (2013.01)

(58) Field of Classification Search
CPC ........................... F21V 33/006; A01M 29/12
See application file for complete search history.

(56) References Cited

U.S. PATENT DOCUMENTS

| 2,327,589 | A | 8/1943 | Besocke | |
|---|---|---|---|---|
| 3,985,493 | A | 10/1976 | Neyret | |
| 5,531,591 | A | 7/1996 | Yamazaki | |
| 6,015,286 | A | 1/2000 | Maruyama | |
| 6,659,763 | B2 | 12/2003 | Fisher | |
| D573,248 | S | 7/2008 | Ryan | |
| 2007/0044667 | A1 | 3/2007 | Steinmetz | |
| 2008/0080174 | A1* | 4/2008 | Xu | F21S 8/081 362/152 |
| 2009/0294553 | A1* | 12/2009 | Wang | A01M 29/12 239/135 |

FOREIGN PATENT DOCUMENTS

AU WO2007/000025 * 4/2007

* cited by examiner

*Primary Examiner* — Elmito Breval
(74) *Attorney, Agent, or Firm* — Levisohon Berger LLP

(57) ABSTRACT

A unit for dispensing repellant having a heating element powered by hydrocarbon combustion. A tank connection assembly within the unit attaches a fuel cartridge and a valve activator controls fuel flowing from the cartridge. A lever that is communication with the fuel activator is independently controllable by a user to initiate and terminate flow of fuel and also is controllable by the unit's cover to terminate fuel flow.

10 Claims, 7 Drawing Sheets

POST MOUNTED DISPENSING DEVICE

RELATED APPLICATIONS

This application is a continuation of pending U.S. patent application Ser. No. 14/016,526, filed on Sep. 3, 2013 and which is to issue as U.S. Pat. No. 9,127,833 on Sep. 8, 2015. U.S. patent application Ser. No. 14/016,526 claims the benefit of U.S. Provisional Appl. Ser. No. 61/695,803 filed on Aug. 31, 2012—the contents of the above-cited prior application are incorporated by reference herein.

FIELD OF THE INVENTION

The present invention relates generally to devices for dispensing volatile active substances. More particularly, the invention relates to a dispensing device that is mountable to a deck or fence post.

BACKGROUND OF THE INVENTION

Handheld, portable devices that utilize heat to evaporate or volatilize active ingredients or other volatile substances are well known in the prior art. Such devices are commonly used to dispense insect control active ingredients or air treatment materials, such as air fresheners. Users employ these devices in a variety of places, such as in their backyards, near swimming pools or patios and the like.

However, portable handheld devices are susceptible to getting lost and damaged. Moreover, if they are left on the ground they may be tipped over or accessed by a child or pet. There is, thus, a need in the art for a permanently affixed or mounted dispensing device, which remains secured and out of harm's way.

SUMMARY OF THE INVENTION

The current invention addresses these problems by providing a dispensing device that is mounted in or on a fence post commonly used around decks, yards, pools and the like. The dispensing device is affixed or integral to the post and, as such, the dispensing unit is in a safer and more permanent environment than conventional handheld, portable dispensers.

The manner in which volatilizable substances are dispensed in the current invention is fundamentally the same as prior dispensers invented by the instant inventors. Namely, a conductive heat plate is provided—upon which a mat impregnated with a volatilizable substance is placed. When the heat plate is sufficiently heated—the volatilizable substances evaporate and are thereby dispensed.

The dispensing device also has a built-in lighting system. The lighting system is comprised of a light emitting device, such as one or more light bulbs and/or LEDs—which are powered by electrical current (either hard wired electric cord or by way of batteries). The lighting system and the dispensing function are independently operable and independently controllable.

DETAILED DESCRIPTION OF THE INVENTION

Embodiments of the present invention will now be described with reference to the above-identified Drawings. However, the Drawings and the description herein of the invention are not intended to limit the scope of the invention. It will be understood that various modifications of the present description of the invention are possible without departing from the spirit of the invention. Also, features described herein may be omitted, additional features may be included, and/or features described herein may be combined in a manner different from the specific combinations recited herein, all without departing from the spirit of the invention.

Figure 1:
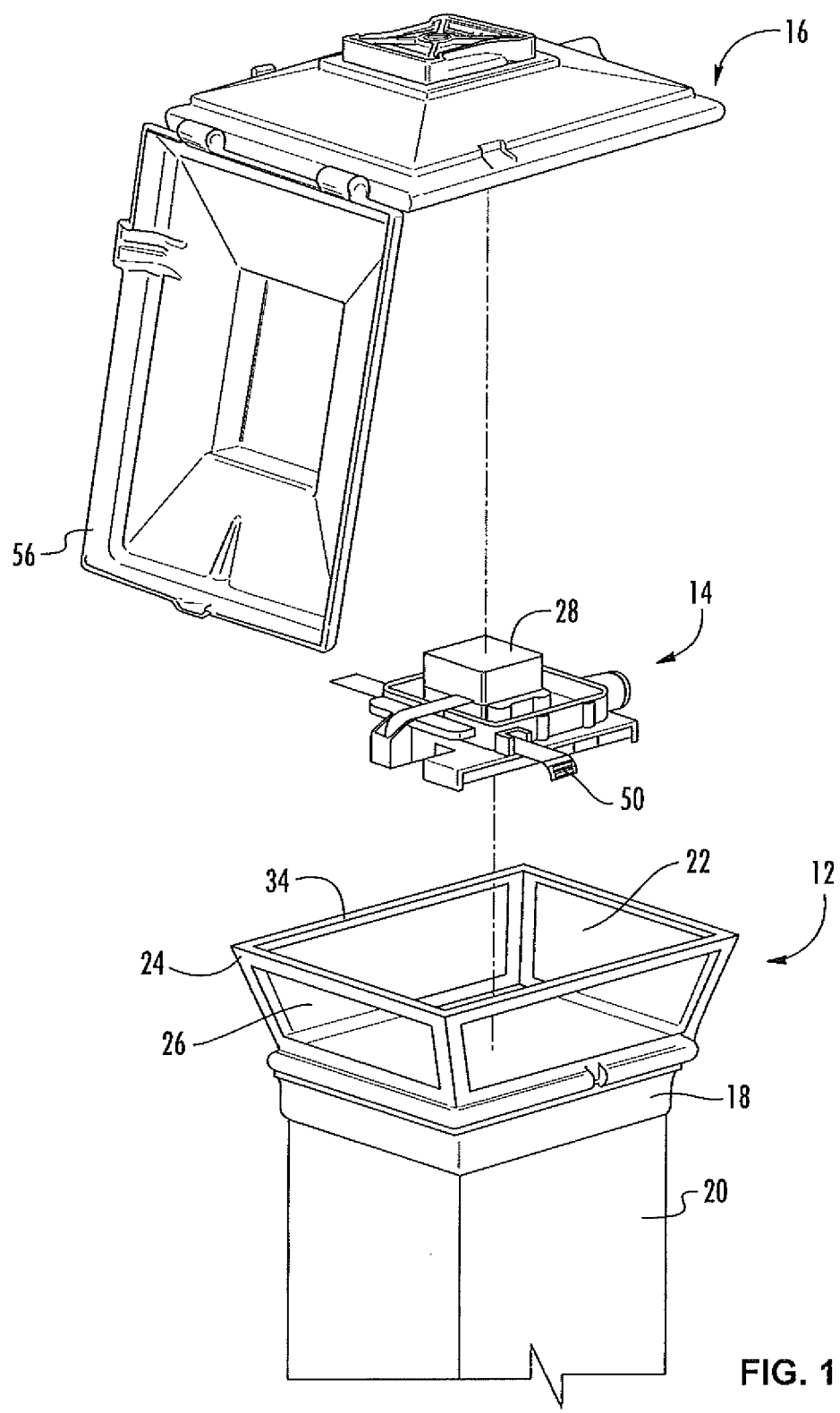
FIG. 1 is an exploded view of a globe, mechanical elements that are to be inserted therein and a cover thereon according to an embodiment of the invention.

FIG. 1 shows an exploded view of a fence post dispenser showing a globe 12, some of the dispenser/light components 14 and a face plate 16. As shown, globe 12 is seated on a rectangular post cap frame 18. The post cap frame 18 has a bottom lip, which surrounds and grips the outside walls of a fence post 20. Post cap frame 20 also has a recessed track (not shown) on its top surface that is sized and shaped to receive and secure the bottom walls of globe 12 in order to secure the globe 12 to the fence post 20.

In a preferred embodiment, and as shown, the walls of the globe 12 angle outwardly as they extend upwardly from the cap frame 18. The globe walls preferably consist of a frame 24 that surrounds a window pane 26. Window pane 26 is made of a transparent or translucent material such as plastic, thermoplastic, glass, Plexiglas® or such similar material. The four walls of the globe connect to form an inner housing 22 or cavity. The tops of the frame 24 create an upper rim 34.

As shown, when assembled, the dispenser/light components 14 ("alternatively "mechanical components") are seated within the inner housing 22 of globe 12. A face plate 16 covers the top of the globe and in a preferred embodiment, the mechanical components are mounted to the underside of the face plate 16.

In a preferred embodiment, a heating plate 28 is positioned on the top side of the mechanical components 14 and a light source is positioned toward the bottom of the mechanical components 14. As such, when the face plate 16 is seated on the globe 12, the light source projects downward into the inner housing 22 of the globe 12 and the heating plate 28 projects upward toward the top of the device—allowing repellent to be dispensed into the air.

Figure 2:
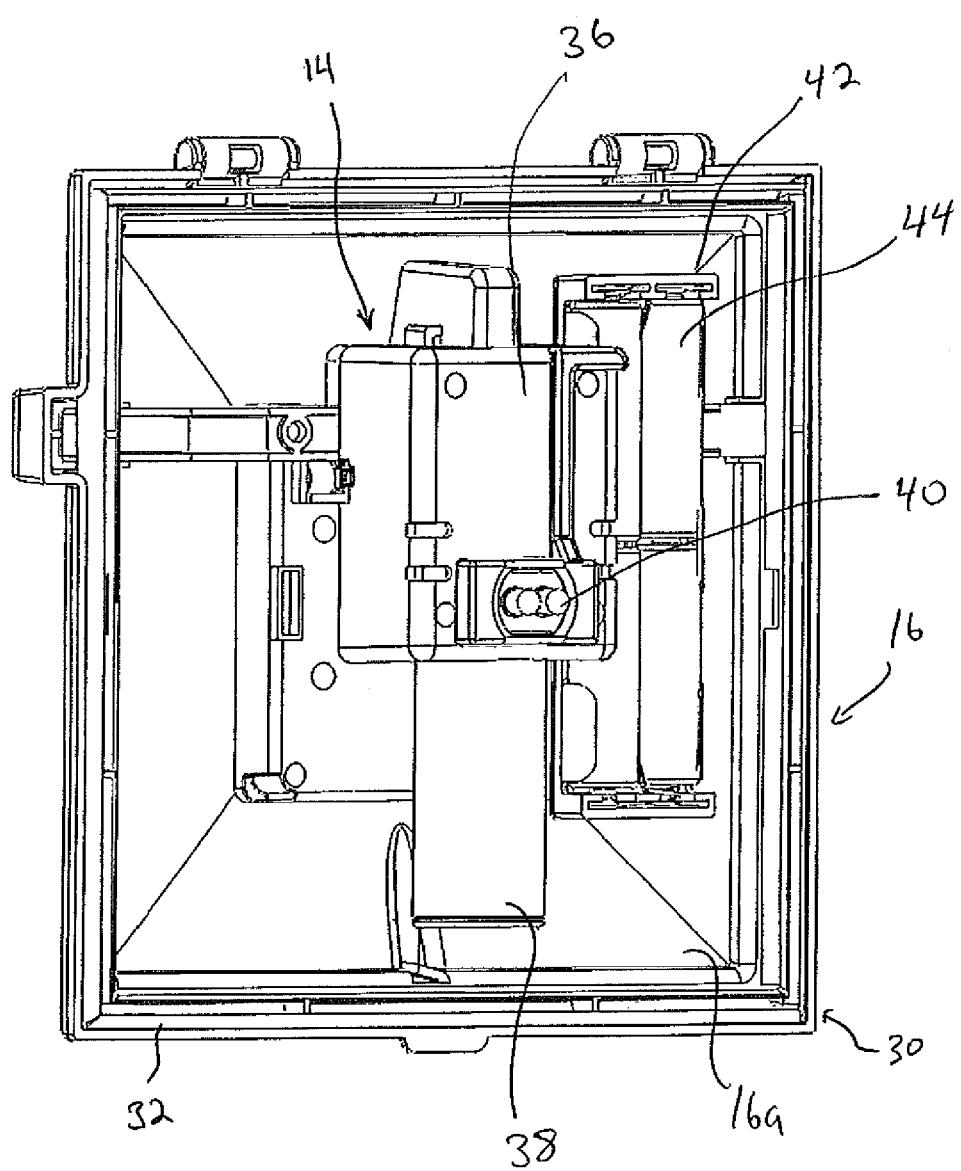
FIG. 2 is a bottom view of a face plate having mechanical elements thereon according to an embodiment of the invention.

FIG. 2 shows a bottom view of a face plate 16 having mechanical components mounted thereon. That is, the dispenser components shown in FIG. 1 are mounted to the underside surface 16a of face plate. A tank connection assembly 36 is shown mounted substantially parallel to the underside surface 16a of face plate 16. Tank connection assembly 36 is a pocket or similar enclosure for receiving a fuel tank 38. As shown, when the fuel cartridge 38 is inserted into the connection assembly 36—it is secured therein and held substantially parallel to the underside surface 16a of face plate 16. The fuel cartridge 38 is used to supply hydrocarbon fuel for combustion in order to heat and thereby dispense volatilizable repellent. This aspect of the invention will be described in more detail below.

In addition to a dispensing system there is also a lighting system that is used as an outdoor light—independent of the dispensing system. As shown, also provided on underside surface 16a of face plate 16 are one or more light bulbs or LEDs 40 that project therefrom and a battery compartment 42 for receiving one or more batteries. Batteries 44 shown in the battery compartment provide electric current to power the bulb or LEDs. In the embodiment shown in FIG. 2, the LEDs are mounted to a tank connection assembly 36, but in other embodiments of the invention, LEDs or bulbs may be mounted in other areas of the underside surface 16a of face plate 16.

Figure 3:
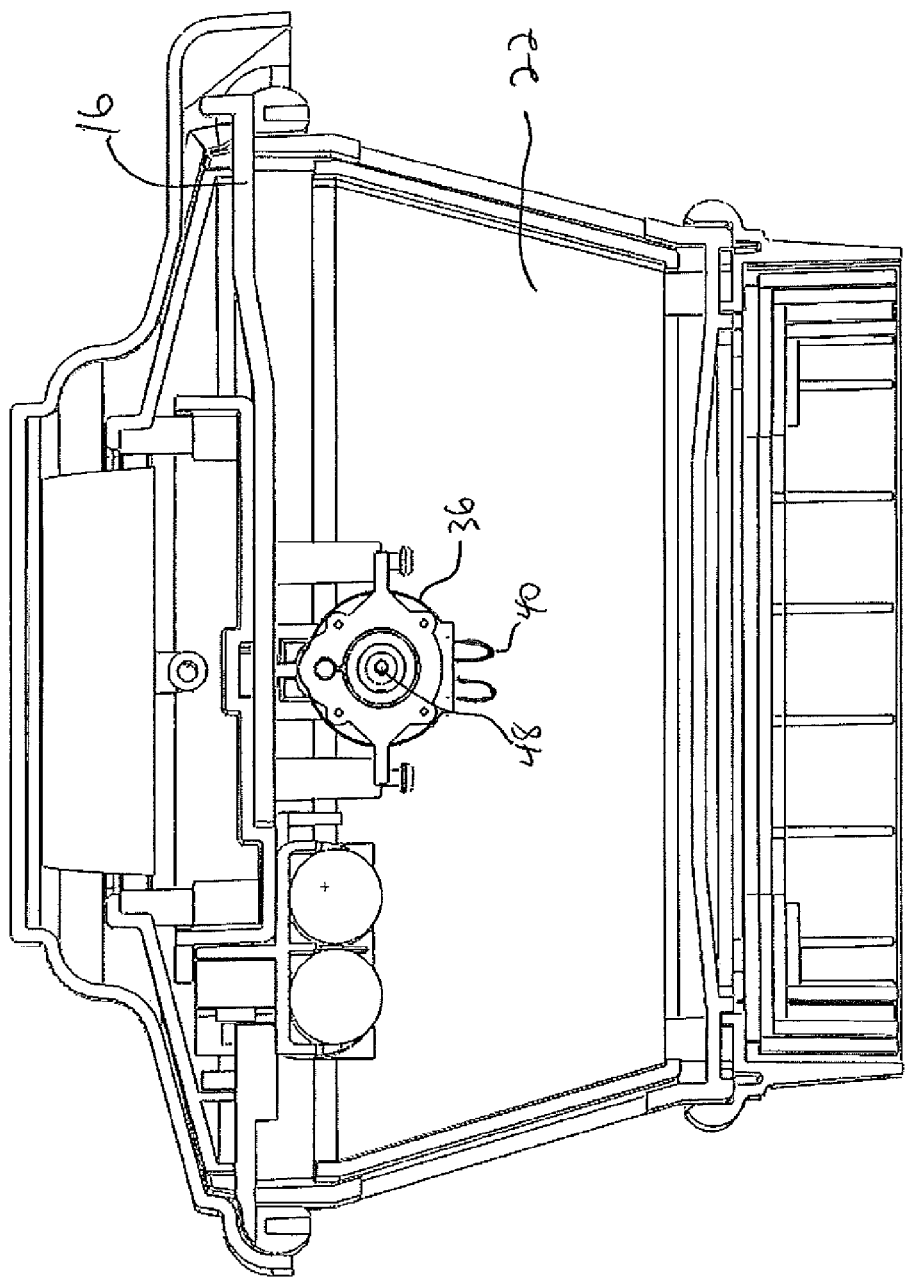
FIG. 3 is a cross-sectional view through a light/dispensing unit according to an embodiment of the invention.

As shown, a frame 30 having an outer lip 32 surrounds face plate 16. The frame 30 is designed to be seated on the upper rim 34 of globe 12. When plate 16 is seated on globe 12, the LEDs 40 project into the cavity 22 of the globe and radiate light therefrom. The heating plate 28 projects upward to be accessible from the top of the unit. FIG. 3 shows a cross-sectional view of a dispensing unit where the face plate 16 and attached mechanical components 14 is seated on the globe 12. A tank connection assembly 35 is shown positioned in the cavity 22 of the globe 12. Light bulbs 40 are shown projecting downward into the cavity 26 and which are used to illuminate the globe.

Figure 4:
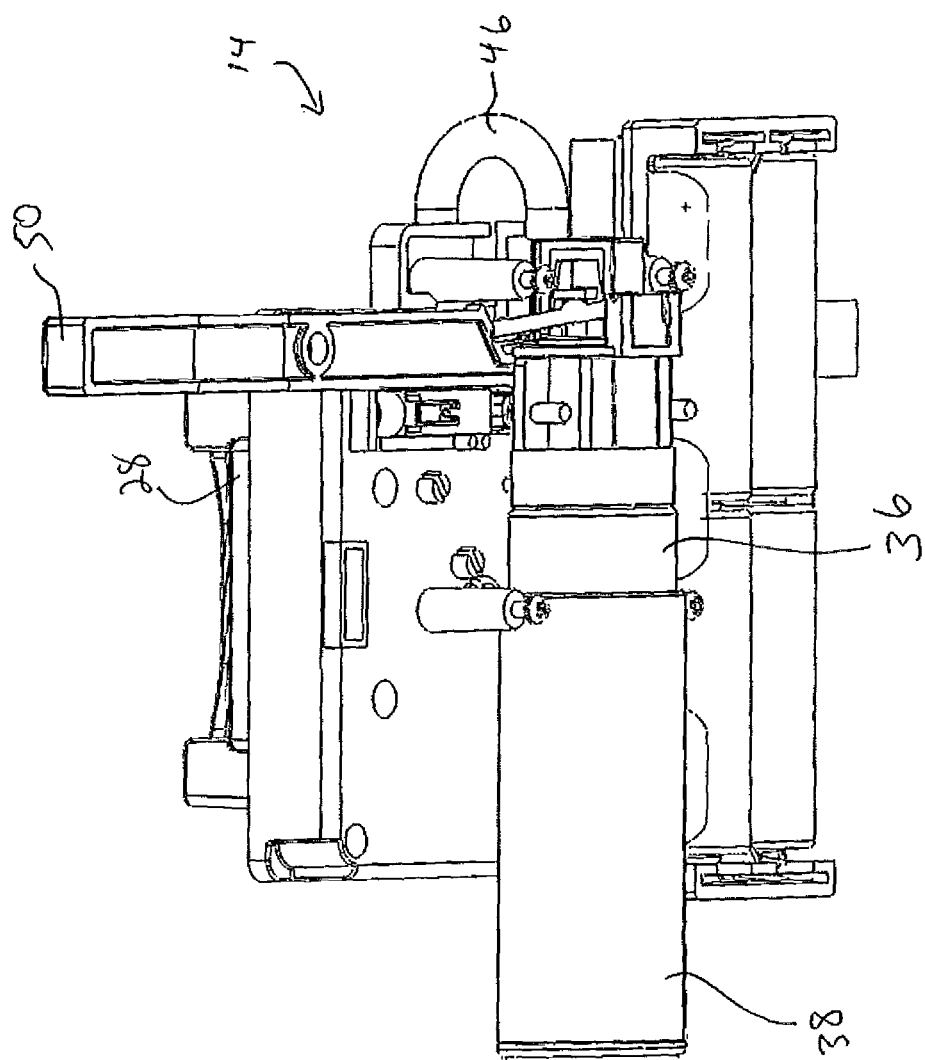
FIG. 4 is an enlarged bottom, perspective of mechanical elements shown without an underlying face plate according to an embodiment of the invention.
Figure 5:
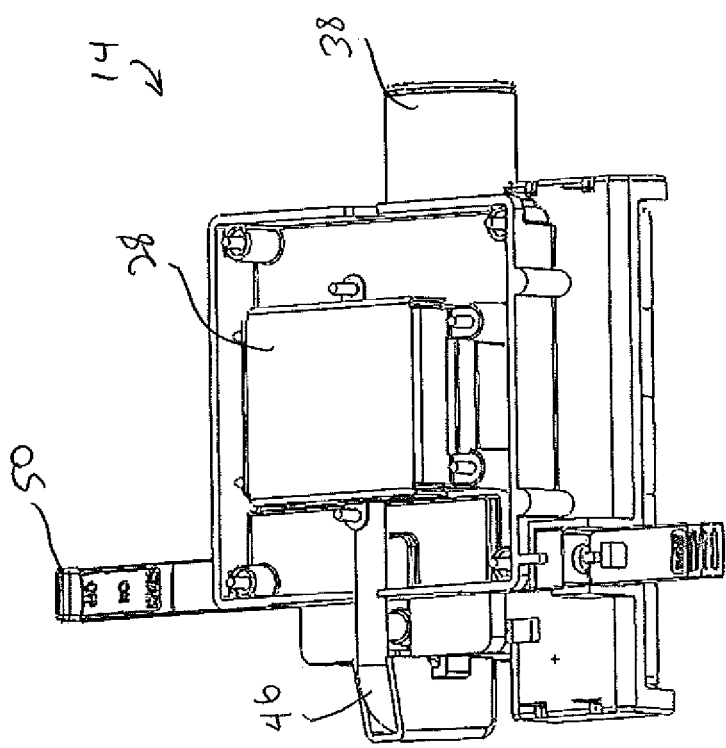
FIG. 5 is an enlarged top, perspective of mechanical elements shown without an overlying face plate according to an embodiment of the invention.

FIG. 4 shows a bottom, perspective view of the mechanical components 14 (without a face plate) of the dispensing system according to an embodiment of the invention. In use, the tank connection assembly 36 and fuel cartridge 38 are placed face down into the globe, whereas, the heating plate is oriented face up on the top of the unit. FIG. 5 shows a top, perspective view of the mechanical components 14. As shown, the heating plate 28 faces up and is oriented to receive a pad impregnated with repellent.

In order to supply constant energy to the heat source, a fuel cartridge (or an electronic cartridge in other embodiments of the invention) must be secured and positioned for dispensing fuel to a combustion nozzle (or electric current to heating element). To that end, a tank connection assembly 36 is (affixed directly or indirectly to the underside 16a of face plate 24) which is adapted to receive a fuel cartridge 38. In one embodiment, tank connection assembly 36 resembles a tunnel. A threaded attachment receptacle is provided inside the tunnel for threadedly engaging a correspondingly threaded fuel tank.

It will be understood that a hydrocarbon heat source to volatilize repellent is exemplary and any of various heat sources are within the teaching of the invention. For example, a heating element powered by a battery may be used to heat insect repellent. Moreover, it will be understood that the dispersal of any of various active ingredients or other volatile substances, such as fragrances and the like are within the teaching of the invention.

In the embodiment of the invention shown in FIG. 4, the tank receptacle is positioned substantially parallel to the undersurface 16a of the plate—thereby receiving a cartridge oriented in substantially the same plane as undersurface 16a. In other embodiments of the invention, the cartridge may be held in an orientation that is orthogonal to face plate 16. That is, the cartridge could extend downward into the globe like the LEDs shown in FIG. 3. In other embodiments of the invention, the cartridge 38 may be oriented at other angles such as a roughly 45° with respect to plate 16.

The cartridge 38 contains a hydrocarbon fuel such as butane. Fuel flowing from the fuel cartridge is delivered to a venturi tube, which has an opening for the intake of air to create a fuel/air mixture. The fuel/air mixture is accelerated into a combustion nozzle, where an ignition system initiates hydrocarbon combustion. In one embodiment of the invention a piezoelectric device is used to generate a spark in order to ignite such hydrocarbon combustion.

In embodiments of the invention, the hydrocarbon fuel source is utilized for dispensing volatilizable substances is one disclosed in any of U.S. Pat. No. 4,699,123, U.S. Pat. No. 4,759,343 and U.S. Pat. No. 4,815,441—each of which is incorporated by reference herein.

Fuel flowing from cartridge 38 is delivered, by way of tube 46 to a combustion nozzle. Because the fuel cartridge 38 is located beneath and substantially parallel to the heating plate 28, a tube is used to deliver fuel away from the cartridge and deliver it upward to a combustion nozzle located above the fuel cartridge. In one embodiment, a tube 46 that is in fluid communication with a fuel cartridge receives fuel therefrom. The tube 46 is then folded back on itself to deliver fuel to the combustion nozzle located beneath the heating plate. As shown, tube 46 captures fuel flowing out of the cartridge and then diverts the fuel upward and roughly 180° to the combustion nozzle. In order to prevent the tube 46 from collapsing, a spring 54 or such similar flexible supportive channel is inserted into the tube 46.

It will be understood that the position of the cartridge 38 and the light bulbs or LEDs 40 as described are exemplary and their positions may be altered in different embodiments of the invention. For example, rather than being position on the face plate 16—bulbs and or LEDs (or any similar light emitting device) may be positioned on the floor of the lamp cavity.

In a preferred embodiment of the invention, a valve activator system is provided to control the release of gas from cartridge 38. In one embodiment the valve activator system comprises a plunger 48 (shown in FIG. 3) having one pointed end that is utilized to depress a fuel cartridge valve. The plunger is spring loaded with enough force to open the cartridge valve. A lever or similar connection to the plunger allows a user to release the plunger to move in the direction of the cartridge valve to open it and allow the free flow of fuel therefrom. Moving the lever so as to force the plunger away from the cartridge valve effectively turns off the flow of fuel.

In one embodiment of the invention, and as shown in FIGS. 4 and 5, the "on," "off" and "ignition" functions are all controlled by a single lever. As shown, lever 50 has one end that contacts a plunger and a second end that extends out of the device to be accessible to a user. Lever 50 also is in close proximity to a piezoelectric device. A user pulls lever 50 a first distance to initiate the flow of fuel from the cartridge. The user then pulls lever 50 a second distance to activate the piezoelectric device. To turn off the dispenser, a user presses the lever back (two distances) to stop the flow of fuel.

Because the heating system and the lighting system have two different power sources and controls—they are each controllable independently of the other. That is, the lights, which are controlled by electric current such as batteries may be switched on or off whether or not the heating system is engaged—and vice versa. This allows a user to use the lamp as a conventional lamp, as an active ingredient dispenser or as both simultaneously.

Figure 6:
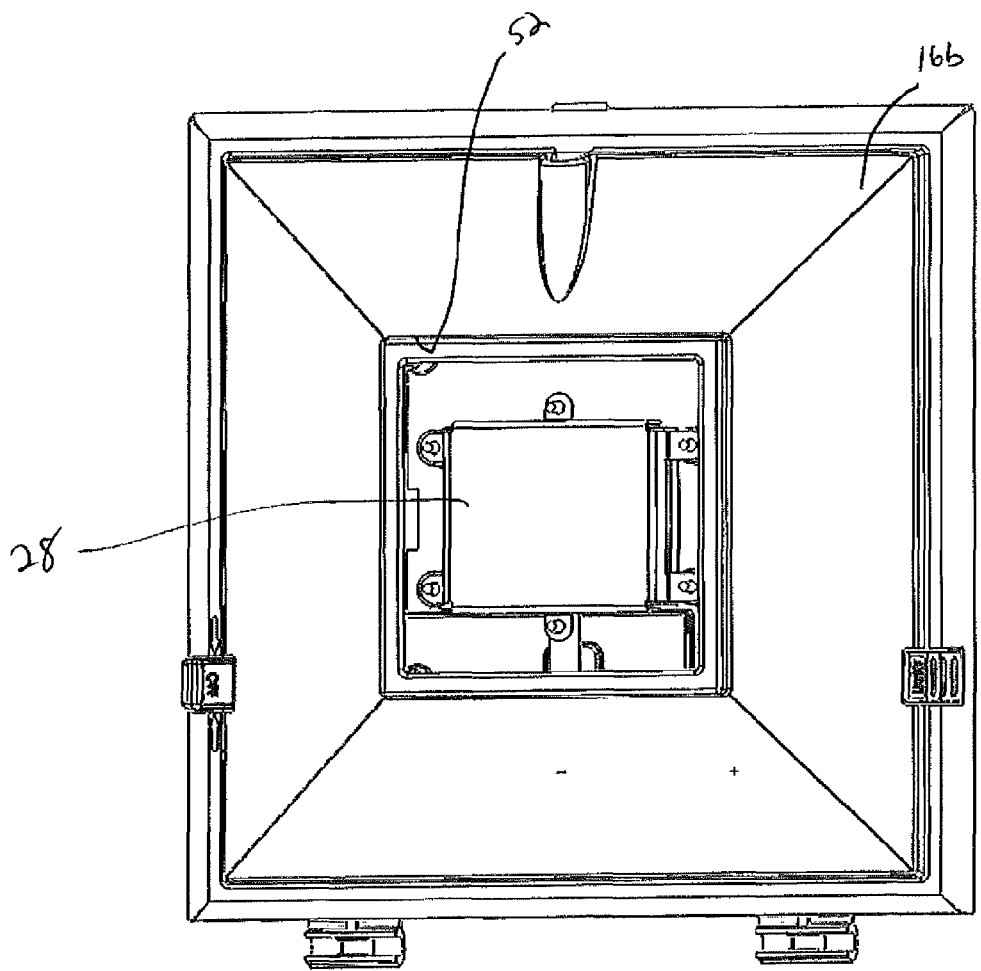
FIG. 6 is a top view of a post cap repellent dispenser according to an embodiment of the invention.
Figure 7:
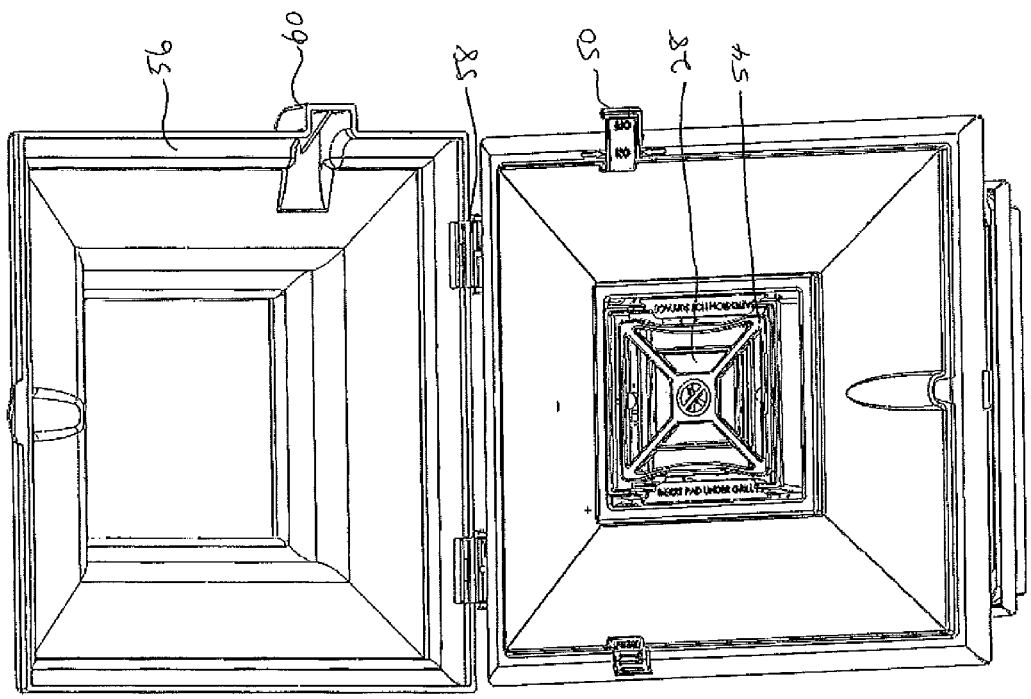
FIG. 7 is a top view of post cap repellent dispenser having a protective grill and a cover according to an embodiment of the invention.

FIG. 6 shows a top view of the dispensing unit. The top surface 16b of face plate 16 is shown having a central substantially rectangular cutout 52. Heating plate 28 is shown below the cutout and substantially parallel to face plate 16. Heating plate 28 is made out of a thermally conductive material—such as aluminum, copper or the like. A burner or similar combustion nozzle (not shown) located beneath the heating plate 28 and in thermal communication therewith heats the heating plate. The heating plate 28 reaches a sufficient temperature to heat a pad that is impregnated with volatilizable substance and thereby cause the substance to be disbursed into the air. In one embodiment of the invention and as shown in FIG. 7, a grill 54 is secured over the cutout 52 to protect a user from the direct contact with the heating plate 28. The grill 54 allows access to the heating plate 28 through a slit or similar aperture so that a user may place a pad thereon. Once volatilized, repellant passes through the spaces in the grill 54 and is disbursed into the surrounding ambient air.

Referring to FIG. 7, in an embodiment of the invention a decorative/protective cover 56 is attached to dispensing device, for example, by way of one or more hinges 58 joining cover 56 to face plate 16. In a preferred embodiment, a small pocket 60 extends from the side of the cover 56. Pocket 60 has a sloped inside surface and as such when the cover is brought to a closed position, the sloping surface pushes lever 50 inward—thereby turning off the unit. As described above, moving the lever inward pushes the plunger away from the cartridge, thereby, closing the cartridge valve and terminating gas flow. This serves an important safety feature, whereby heat source is automatically turned off upon closing the unit's lid—avoiding the risk of burning and/or melting the cover 56.

Having described this invention with regard to specific embodiments, it is to be understood that the description is not meant as a limitation since further modifications and variations may be apparent or may suggest themselves to those skilled in the art. It is intended that the present application cover all such modifications and variations.

What is claimed is:

1. A dispensing apparatus, comprising:
a housing having a cover,
said cover having a sloped inside surface,
a combustion nozzle for sustaining hydrocarbon combustion located within said housing,
a tank connection assembly for securing a fuel cartridge located below said combustion nozzle,
a tube for carrying fuel from a fuel cartridge to said combustion nozzle,
a valve activator system for controlling release of fuel from a fuel cartridge, and
a lever in communication with said valve activator,
said lever being independently movable by a user and by said cover, said lever being movable by the user from a first position to a second position and from a second position to a first position, whereby movement of said lever by the user to said second position causes the flow of fuel to said combustion nozzle and movement of said lever by the user into a said first position terminates flow of fuel to said combustion nozzle, and said sloped inside surface moving said lever from said second position to said first position if said lever is in said second position when said cover is lowered.

2. The dispensing apparatus of claim 1, further comprising a heating plate disposed on top of said combustion nozzle.

3. The dispensing apparatus of claim 1, whereby said valve activator system comprises a plunger, said plunger having a pointed end to depress a valve on a fuel cartridge.

4. The dispensing apparatus of claim 3, whereby said lever is in communication with said plunger.

5. The dispensing apparatus of claim 4, whereby moving said lever to said first position forces said plunger away from a fuel cartridge and moving said lever to said second position moves said plunger to engage with a fuel cartridge.

6. The dispensing apparatus of claim 1, whereby said cover is hingedly mounted to said housing.

7. The dispensing apparatus of claim 1, wherein said sloped inside surface comprises a pocket, said pocket sized and shaped to engage with said lever.

8. The dispensing device of claim 2, whereby said heating plate is adapted to support a mat impregnated with a volatilizable substance.

9. The dispensing device of claim 8, whereby said volatilizable substance is insect repellant.

10. The dispensing device of claim 1, whereby said housing is mounted on a fence post.

* * * * *